United States Patent [19]

Kubota et al.

[11] Patent Number: 5,020,982

[45] Date of Patent: Jun. 4, 1991

[54] APPARATUS FOR VULCANIZING ELASTOMER PRODUCT

[75] Inventors: Akinori Kubota, Kobe; Masaaki Ijiri, Aichi; Michihito Kobayashi, Toyota, all of Japan

[73] Assignee: Sumitomo Rubber Industries Limited, Kobe, Japan

[21] Appl. No.: 287,413

[22] Filed: Dec. 20, 1988

[30] Foreign Application Priority Data

Dec. 29, 1987 [JP] Japan .................. 62-334256
Jul. 19, 1988 [JP] Japan .................. 63-180798

[51] Int. Cl.$^5$ ............... B29C 35/04; B29D 30/00
[52] U.S. Cl. .......................... 425/42; 264/85;
    264/315; 264/326; 425/28.1; 425/50
[58] Field of Search ........... 264/315, 326, 501, 502,
    264/85; 425/22, 23, 24, 25, 27, 36, 39, 40, 42,
    44, 48–52, 28.1, 29

[56] References Cited

U.S. PATENT DOCUMENTS

| | | | |
|---|---|---|---|
| 2,846,722 | 8/1958 | Soderquist | 425/42 |
| 2,858,566 | 11/1958 | Brundage | 425/42 |
| 3,118,181 | 1/1964 | Cork | 425/23 |
| 3,329,748 | 7/1967 | Hugger | 264/315 |
| 3,887,313 | 6/1975 | Jaedicke et al. | 425/42 |
| 4,027,543 | 6/1977 | Johnston | 264/85 |
| 4,184,823 | 1/1980 | Williams | 425/36 |
| 4,370,283 | 1/1983 | Arimatsu | 264/37 |
| 4,382,052 | 5/1983 | Arimatsu | 264/85 |
| 4,527,946 | 7/1985 | Singh et al. | 425/36 |
| 4,684,338 | 8/1987 | Steidl et al. | 264/315 |
| 4,721,446 | 1/1988 | Ichikawa | 425/44 |

FOREIGN PATENT DOCUMENTS

| | | | |
|---|---|---|---|
| 57-185134 | 11/1982 | Japan . | |
| 59-70537 | 4/1984 | Japan | 425/44 |
| 61-57314 | 3/1986 | Japan | 425/50 |
| 61-76323 | 4/1986 | Japan | 425/52 |
| 62-201206 | 9/1987 | Japan | 425/51 |
| 980043 | 1/1965 | United Kingdom . | |
| 2120967 | 12/1983 | United Kingdom | 425/48 |

*Primary Examiner*—Jan H. Silbaugh
*Assistant Examiner*—Mathieu Vargot
*Attorney, Agent, or Firm*—Jordan and Hamburg

[57] ABSTRACT

Apparatus for vulcanizing an elastomeric product includes separate passageways for supplying a heating medium to a lower portion of the vulcanizing chamber and an inert gas pressurizing medium to the upper portion of the chamber. The mixing of the fluids minimizes the temperature difference in the inner space of the product and ensures a uniform vulcanization.

17 Claims, 10 Drawing Sheets

APPARATUS FOR VULCANIZING ELASTOMER PRODUCT

BACKGROUND OF THE INVENTION AND RELATED ART STATEMENT

This invention relates to a method and apparatus for vulcanizing an elastomer product such as a tire for a motor vehicle using gas and steam as a pressurizing medium and a heating medium.

FIG. 9 shows a conventional method for vulcanizing elastomer product such as a tire for a motor vehicle using gas as a pressurizing medium which comprises the steps of placing a tire 2 in a mold 1, bringing a bladder 3 in contact with the inner surface of the tire 2 with application of pre-shaping pressure, closing the mold 1 to bring the tire 2 in contact with the mold inner surface, heating the tire 2 under pressure by supplying steam as a heating medium, the steam being blown in a substantially horizontal direction from nozzles 59 provided in a central unit of the vulcanizing machine and communicated with a supply passage 70 into an inner space 6 of the tire 2 or vulcanizing chamber, stopping the supply of steam either when the temperature of the tire rises to a specified temperature or after the lapse of a predetermined period of time, and supplying combustion gas or nitrogen gas as a pressurizing medium at a pressure equal to or higher than that of the steam, the gas being blown in a horizontal directions from the nozzles 59 or pressurizing medium nozzles provided at the same level as the steam nozzles 59 and communicated with the supply passage into the inner space 6 of the tire 2.

In the conventional method in which steam is blown in a substantially horizontal direction, an amount of steam condenses in a lower portion of the inner space 6 without being discharged and tends to prevent the lower side wall of the tire 2 from rising in temperature. Pressurizing gas has a temperature lower than that of steam. A portion to which pressurizing gas is blown, e.g., the lower bead portion, is liable to be undesirably cooled. Additionally, pressurizing gas has a specific gravity greater than that of steam when being introduced and is accordingly liable to stay in a lower portion of the inner space 6. Consequently, the temperature of the lower side wall and lower bead portion of the tire which are in contact with low temperature gas becomes low. On the other hand, steam is liable to stay in an upper portion of the inner space 6 and comes to a high temperature because of being adiabatically compressed by pressurizing gas supplied at high pressure. This results in an undesirable rise in the temperature of the upper side wall of the tire 2. In the inner space 6, consequently, there are a layer 61 of steam in the upper portion, a layer 62 of gas in the lower portion, and a layer 63 of steam condensate in the lowermost portion. Accordingly, as shown in FIG. 4a, for example, the temperature at point A on the upper bead portion of the tire 2 rises as shown by solid line 16 after gas is supplied, the temperature at point B on the lower bead portion of the tire 2 lowers as shown by solid line 15 after gas is introduced. Consequently, a great temperature difference, e.g., 13° C., occurs between points A and B.

Also, as shown in FIG. 4b, the temperature at point C on the upper side wall of the tire 2 rises as shown by solid line 16a after gas is supplied, the temperature at point D on the lower side wall of the tire 2 does not rise as shown by a solid line 15a after gas is supplied. Consequently, a great temperature difference, e.g., 12° C., occurs between points C and D.

After such a great temperature difference occurs, the temperature difference does not entirely disappear until vulcanizing the operation is completed. Accordingly, it could be seen that the vulcanization degrees of the upper and lower side walls of the tire 2 become different from each other. Such difference is undesirable to the quality of product. Moreover, since the necessary vulcanizing time of a tire is determined based on vulcanization of a lower portion of the tire where the temperature rises most slowly, an undesirale long time is required. It would be apparent that such a long time is disadvantageous as regards productivity and energy saving.

SUMMARY OF THE INVENTION

The present invention has overcome the above-mentioned problems.

It is an object of the present invention to provide a method and apparatus for vulcanizing elastomer product which makes it possible to eliminate temperature difference from occurring in the elastomer product during gas vulcanizing to assure uniform vulcanizing and reduce energy loss.

Accordingly, a method of the present invention comprises the steps of heating under pressure an elastomer product placed in a mold by supplying a heating medium such as steam, stopping the supply of the heating medium when the elastomer product rises to a predetermined temperature or after the lapse of a specified period of time, supplying a pressurizing medium such as nitrogen gas at a pressure equal to or higher than that of the heating medium until the heating process is completed, and discharging the vulcanizing medium after the heating process, the heating medium being blown to a lower portion of the vulcanizing chamber, the pressurizing medium being blown to an upper portion of the vulcanizing chamber.

Also, according to the present invention, in an apparatus for vulcanizing an elastomer product in which an elastomer product placed in a mold is heated under pressure by supplying a heating medium such as steam, the supply of the heating medium is stopped when the elastomer product rises to a predetermined temperature or after the lapse of a specified period of time, a pressurizing medium such as nitrogen gas is then supplied at a pressure equal to or higher than that of the heating medium until the heating process is completed, and the vulcanizing medium is finally discharged after the heating process, the improvement comprises a first supply means for blowing the heating medium to a lower portion of the vulcanizing chamber and a second supply means for blowing the pressurizing medium to an upper portion of the vulcanizing chamber.

Accordingly, the heating medium or steam having a high temperature is blown in a downward direction in an inner space of the elastomer product. The pressurizing medium or gas having a low temperature is blown in an upward direction. When using steam as a heating medium, the steam is liable to undergo condensation in the bottom portion of the inner space, and such condensation is dispersed by virtue of its downward flow. Consequently, condensate which hinders heating of the lower portion of the tire is greatly reduced. Furthermore, since steam having a high enthalpy is blown to a lower portion, the lower portion is more effectively heated.

Moreover, gas as a pressurizing medium cools the upper portion of the inner space and mixes with steam due to the upward moving energy at the initial blowing. Consequently, the steam is prevented from being adiabatically compressed in an upward direction. Further, even at a stage where the inner pressure increases to decrease the blowing velocity of gas and steam undergoes condensation to allow gas to blow in, gas mixes with the steam in the lower portion because it moves down due to its low temperature and high specific gravity. Consequently, heat exchange occurs between the gas and the steam, so that the gas rises in temperature. As a result, the gas does not stay in the lower portion and widely disperses, which consequently prevents temperature difference from occurring in the inner space of the tire or vulcanizing chamber.

BRIEF DESCRIPTION OF THE DRAWINGS

FIG. 3b is a side view of a steam blowing section of the embodiment of FIG. 3a;

FIG. 3c is a side view of a gas blowing section of the embodiment of FIG. 3a;

FIG. 4a and 4b are graphs showing the relationship between vulcanizing time and temperature of specified points on an elastomer product in the embodiment of FIG. 3a;

FIG. 5b is a vertical sectional view showing another gas blowing section of the embodiment of FIG. 5a;

FIG. 6b is a side view of a steam blowing section of the embodiment of FIG. 6a;

FIG. 6c is a side view of gas blowing section of the embodiment of FIG. 6a;

FIG. 7b is a plan view of gas blowing section of the embodiment of FIG. 7a;

FIG. 8b is a plan view of a gas blowing section of the embodiment of FIG. 8a.

DETAILED DESCRIPTION OF PREFERRED EMBODIMENTS OF THE INVENTION

Figure 1:
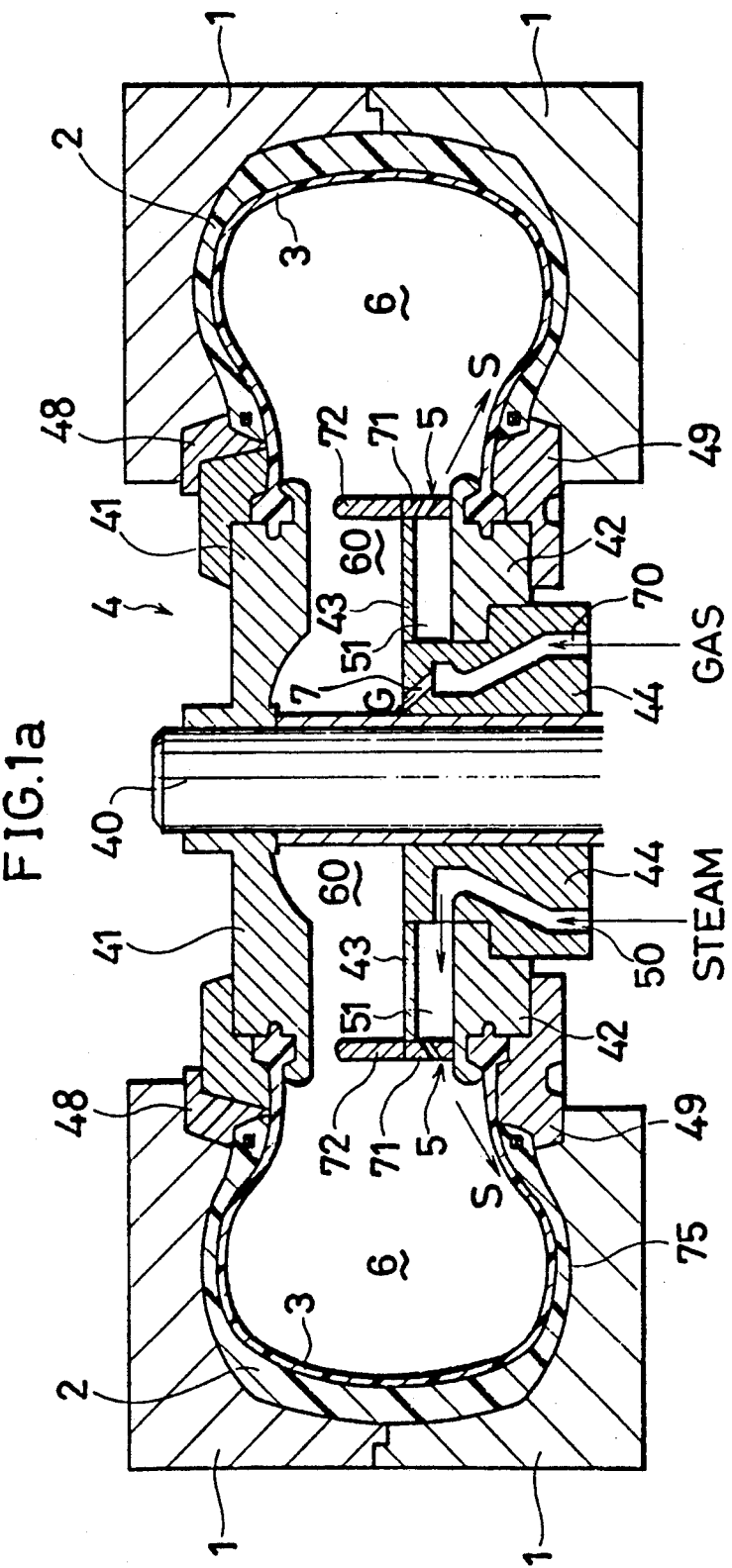
FIG. 1a is a vertical sectional view showing a first embodiment of the present invention.
FIG. 1b is a partial side view of a weir wall member of the first embodiment.
Figure 9:
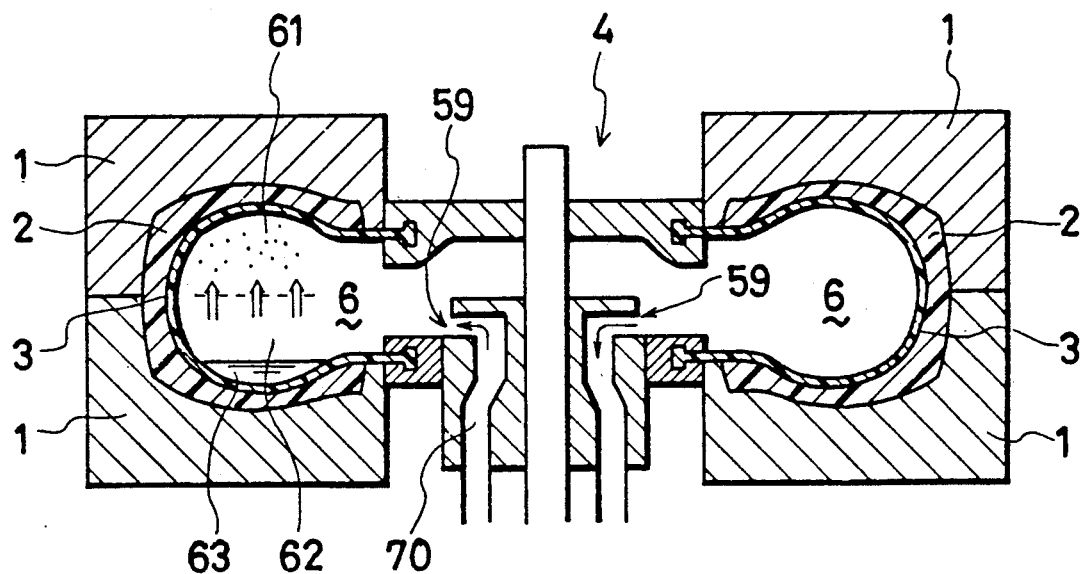
FIG. 9 is a vertical sectional view of a conventional apparatus.
Figure 3D:
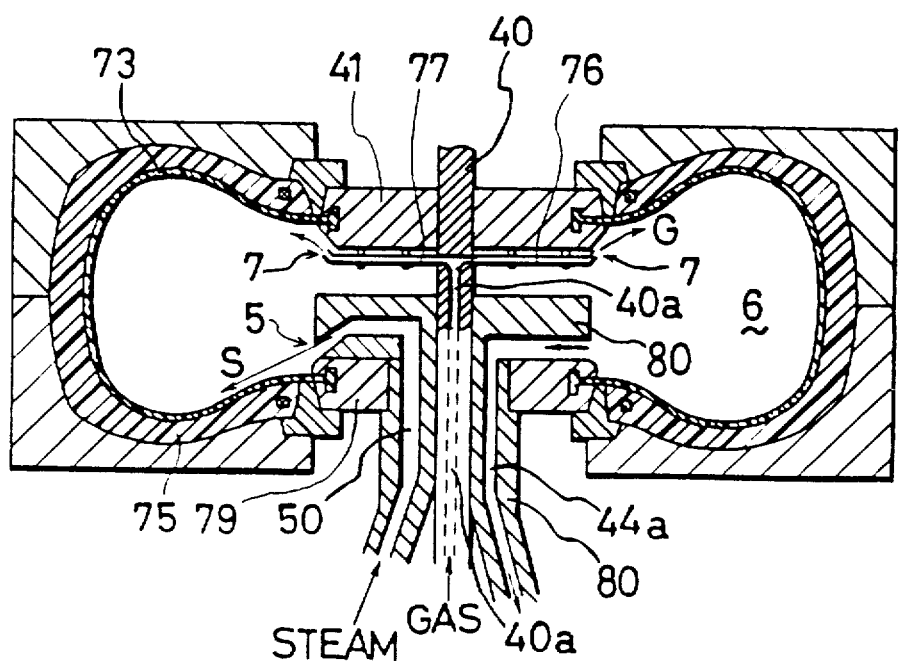

Referring to FIGS. 1a and 1b showing a first embodiment of the present invention, a mold 1 and a central unit 4 of a vulcanizing machine are almost the same as the conventional apparatus of FIG. 9. However, means for blowing steam and gas provided in the central unit 4 is different. More specifically, a center post 40 and an upper clamp member 41 are constructed in the same manner as the conventional apparatus. However, a first blow means is constructed as follows. A steam supply passage 50 is formed in a piston gland 44. Also, an annular supply junction chamber 51 is formed around the center post 40 and defined by a ring-like upper plate 43 mounted on an upper portion of the piston-gland 44 and a circumferential weir wall member 71 mounted on the peripheral end portion of a top surface of a lower clamp member 42. The supply junction chamber 51 is communicated with the steam supply passage 50. The circumferential weir wall member 71 of the supply junction chamber 51 has a plurality of steam nozzles 5 at a predetermined interval in a peripheral direction of the circumferential weir wall member 71. The nozzle 5 is directed in a downward direction so as to face a lower portion of the inner space of a tire 2, more specifically, to face a lower side wall 75 of the tire 2. In the drawing, numeral 49 denotes a lower bead ring and numeral 48 an upper bead ring. A second blow means is constructed as follows. A gas supply passage 70 is formed in the piston gland 44. The gas supply passage 70 also serves as a steam condensate discharging passage. For example, two nozzles 7 are formed in an upper portion of the piston gland 44, namely at a lower position in the neighborhood of a central mechanism of the vulcanizing machine. The nozzle 7 is communicated with the gas supply passage 70 and is directed in an upward direction so as to face an upper portion of an inner space, for example, to the upper central portion of the vulcanizing machine. A cylindrical partition or enclosing wall 72 is mounted on the circumferential weir wall member 71 of the junction chamber 51 so as to define a space 60 for gas.

The distance between the upper end of the enclosing wall 72 and the bottom surface of the upper clamp member 41 is set within about 10% to 30% of the distance between the bottom surface of the upper clamp member 41 and the top surface of the lower clamp member 42 when the mold is entirely closed. In the case of 30% or more, the gas enclosing (sheeting) effect is reduced. In the case of 10% or less, on the other hand, the effect of draining steam condensate is decreased.

Figure 2:
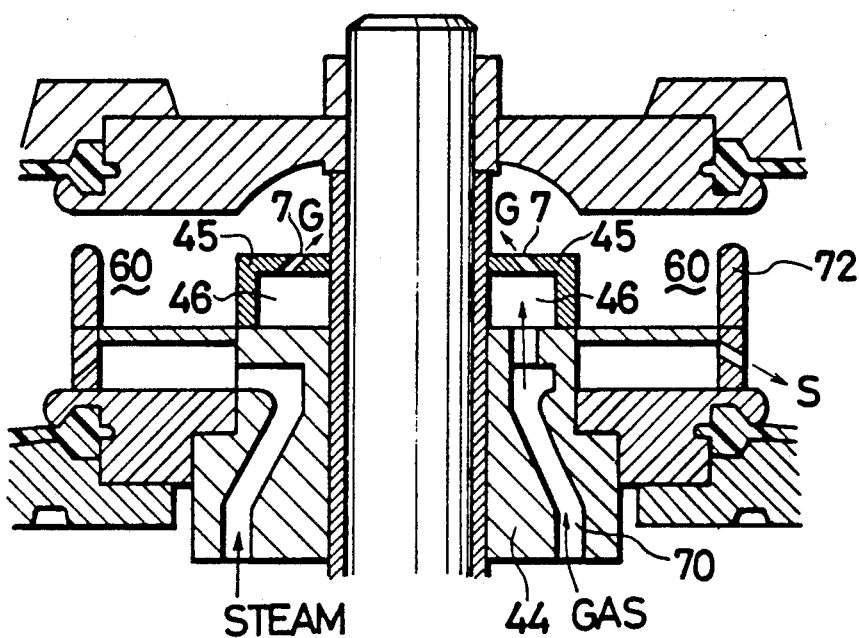
FIG. 2 is a vertical sectional view showing a second embodiment of the present invemntion.

FIG. 2 shows a second embodiment of the present invention which is the same as the embodiment of FIG. 1a with exception of the followings. An annular gas supply junction chamber 46 is provided over a top surface of a piston gland 44 and around a center post 40. The gas supply chamber 46 is defined by a casing 45. The gas supply junction chamber 46 is communicated with a gas supply passage 70. The casing 45 has a plurality of gas nozzles 7 in a peripheral direction in the top wall thereof. The nozzle 7 is directed so as to face an upper portion of a vulcanizing chamber, for example, so as to face an upper central portion of the chamber. It should be noted that in this embodiment, a partition or enclosing wall 72 is not always needed.

Figure 3A:
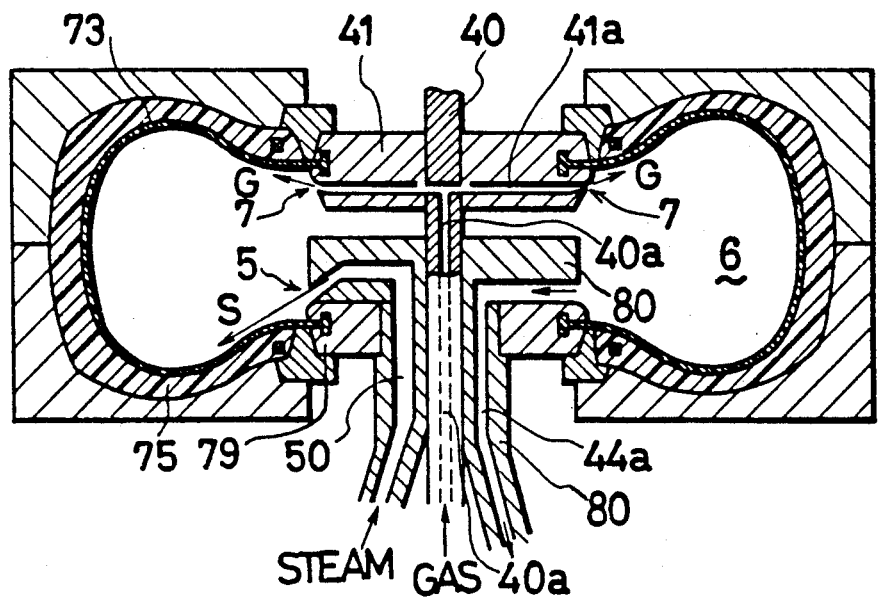
FIG. 3a is a vertical sectional view showing a third embodiment of the present invention.
Figure 3B:
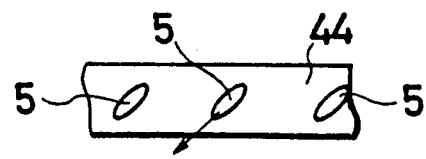
Figure 3C:
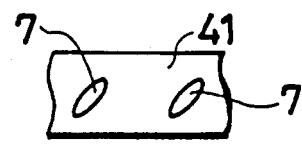

FIGS. 3a, 3b, and 3c illustrate a third embodiment in which the present invention is applied for a Bag-O-Matic type vulcanizing machine. A second blow means is constructed as follows. A gas supply passage 40a is formed in a center post 40 and communicated with a plurality of blow passages 41a which are radially formed in an upper clamp member 41. Nozzles 7 are formed at a forward end of each of the blow passages 41a so as to face an upper portion of an inner space 6, for example, so as to face an upper side wall 73 of a tire. Furthermore, it may be appropriate that the nozzle 7 is directed in an upward peripheral direction so that upwardly blown gas can circulate in a peripheral direction in the inner space 6 of the tire.

Furthermore, a first blow means is constructed as follows. A steam supply passage 50 is formed in the lower clamp ring hub 79 and communicated with a plurality of nozzles 5 which face a lower portion of the inner space 6, for example, face a lower side wall 75 of the tire. It may be appropriate that the nozzle 5 is directed in a downward peripheral direction so that downwardly blown steam can circulate in a peripheral direction in the inner space 6. The lower clamp ring hub 79 has a passage 44a for discharging steam and gas. An upper portion of the passage 44a extends in a radial direction to communicate with the inner space 6. It would be noted that it is sufficient to provide one opening to communicate the passage 44a with the inner space 6.

Figure 3D:
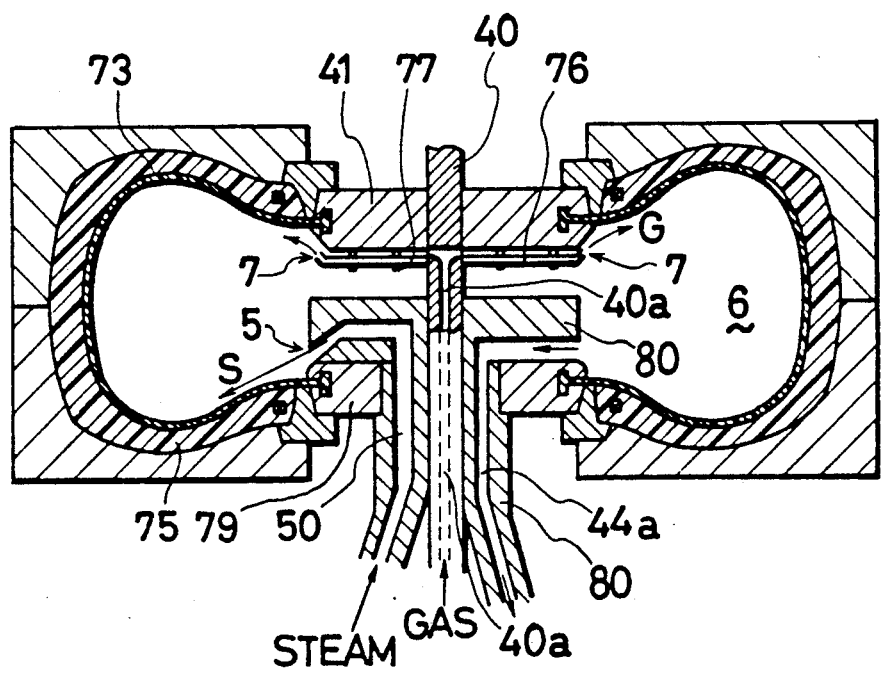
FIG. 3d is a vertical sectional view showing a fourth embodiment of the present invention.

FIG. 3d shows a fourth embodiment in which a plurality of tubular supply members 76 are radially fixed to the underside of an upper clamp member 41 by retainers 77. One end of each member 76 is communicated with a supply passage 40a formed in an center post, the other end being communicated with the upper portion of inner space 6, thus forming a second blow means.

Figure 3E:
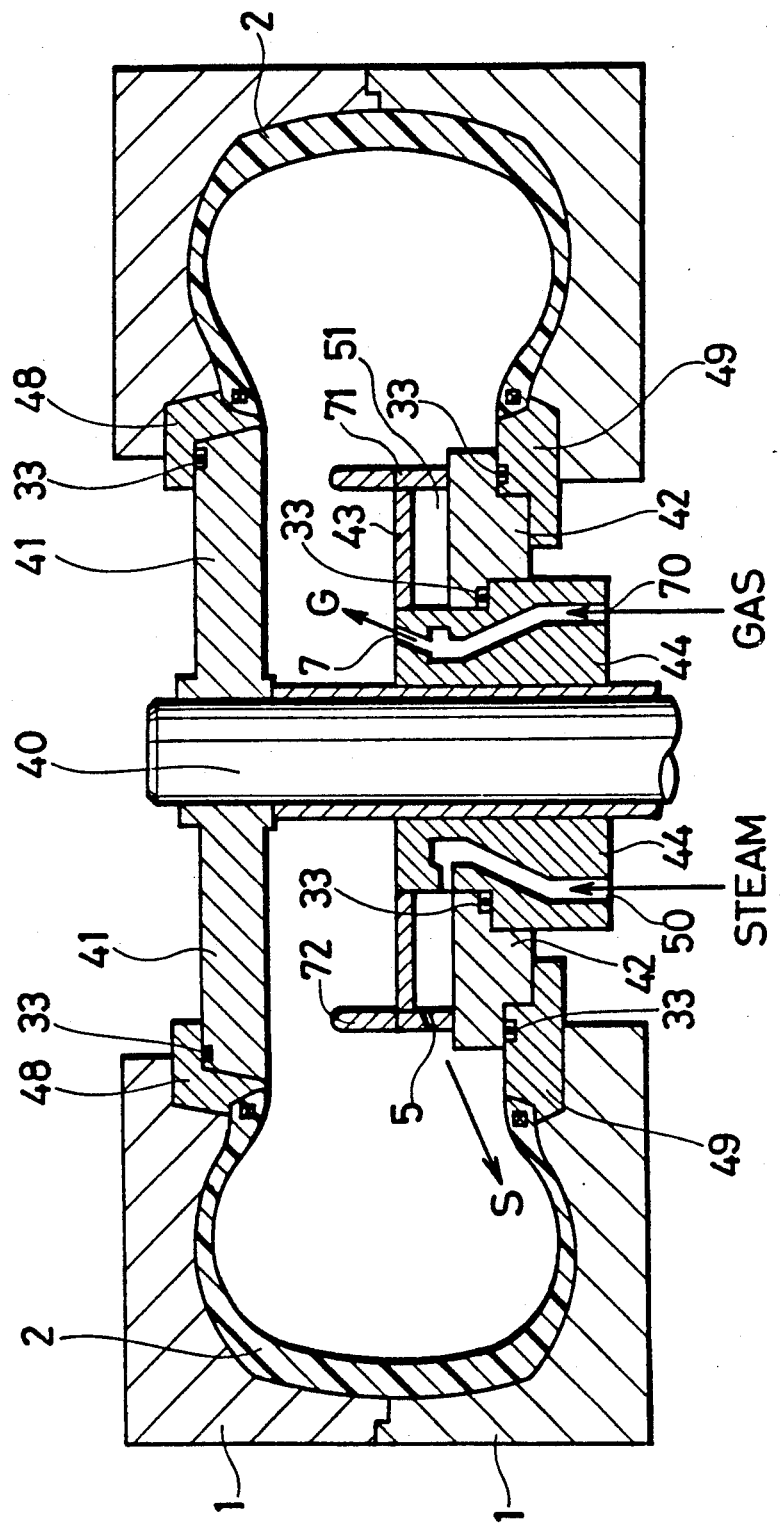
FIG. 3e is a vertical sectional view showing a fifth embodiment of the present invention.

FIG. 3e shows a fifth embodiment in which a bladder is not used.

It is noted that the present invention can be applied for bladderless vulcanizing machines carrying no bladder, for example, one as shown in FIG. 3e, as well as ones carrying a bladder. In such a bladderless vulcanizing machine as shown in FIG. 3e, sealing rings 33 are provided in appropriate positions, specifically, an interface between an upper bead ring 48 and an upper clamp member 41, an interface between a lower bead ring 49 and a lower clamp member 42, and an interface between a piston gland 44 and the lower clamp member 42 to assure sealing of these interfaces. The piston gland 44, which is provided in a center lower portion of the vulcanizing machine, is formed with a gas supply passage 70. A nozzle 7 is formed in an upper portion of the piston gland 44 and directed in an upward direction. Also, the piston gland 44 is formed with a steam supply passage 50. The steam supply passge 50 is communicated with an annular supply junction chamber 51 which is formed around a center post 40 and defined by a ring-like upper plate 43 mounted on an upper portion of the piston gland 44 and a circumferential weir wall member 71 mounted on a peripheral end portion of a top surface of the lower clamp member 42. The weir wall member 71 of the supply junction chamber 51 has a plurality of steam nozzles 5 at a predetermined interval in a peripheral direction of the weir wall member 71. The nozzle 5 is directed in a downward direction so as to face the lower portion of the inner space of a tire 2, more specifically, to face the lower side wall 75 of the tire 2.

Figure 5A:
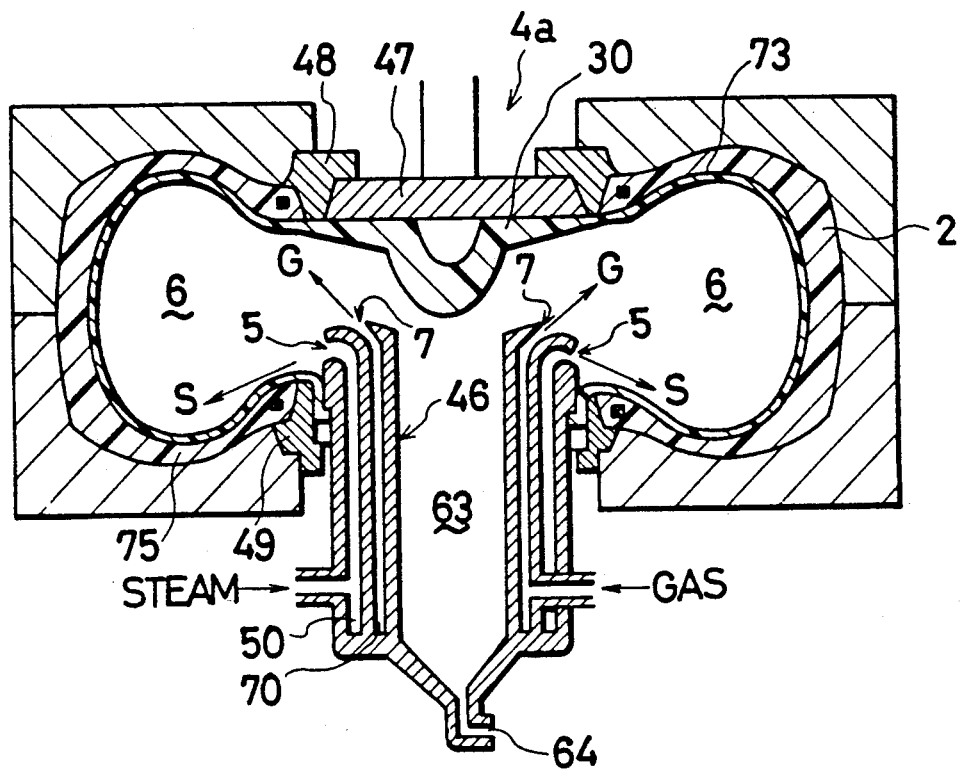
FIG. 5a is a vertical sectional view showing a sixth embodiment of the present invention.
Figure 5B:
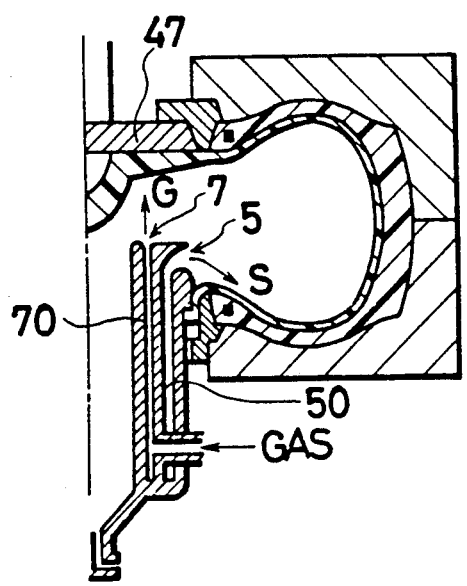
Figure 5C:
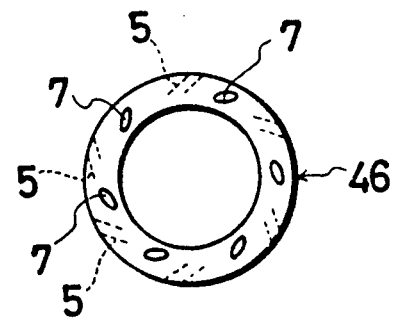
FIG. 5c is a plan view of the gas blowing section of FIGS. 5a and 5b.

FIGS. 5a, 5b, and 5c illustrate a sixth embodiment in which the present invention is applied for an auto-form type vulcanizing machine. As shown in FIG. 5a, a central mechanism 4a comprises a chuck assembly 47, a bead ring 48 mounted around the assembly 47, a bag well 46, and a bead ring 49 mounted around the bag well 46. A bladder 30 extends across an upper center portion where it is received by the chuck assembly 47 and the bead ring 48. The inner peripheral end of the bladder 30, which is positioned in a lower portion, is held by the bag well 46 and the bead ring 49.

The bag well 46 has a space 63 in its center portion and an outlet 64 for discharging steam and gas from the inner space 6 in its lower end. The bag well 46 is also provided with a steam supply passage 50 and a gas supply passage 70. The steam supply passage 50 is communicated with a plurality of steam nozzles 5 which are circumferentially arranged at a predetermined interval in an upper portion of the steam supply passage 50 and are formed so as to face the lower portion of the inner space 6, for example, to face the lower side wall 75 of a tire 2, thus providing a first blow means. The gas supply passage 70 is communicated with a plurality of gas nozzles 7 which are circumferentially arranged at a predetermined interval in an upper portion of the gas supply passage 70, namely at a lower position in the neighborhood of the central mechanism of the vulcanizing machine. The nozzle 7 is formed so as to face the upper portion of the inner space 6, for example, to face the upper side wall 73 of the tire 2, then providing a second blow means.

FIG. 5b shows a modification of the fourth embodiment in which steam nozzles 5 are made to face in a peripheral downward direction while gas nozzles 7 are made to face the chuck assembly 47.

The nozzles 5 and 7 of FIGS. 5a and 5b are formed so as to be respectively inclined in the same direction with respect to radial directions so as to allow blown steam and gas to circulate in the same peripheral direction in the inner space 6.

Figure 5D:
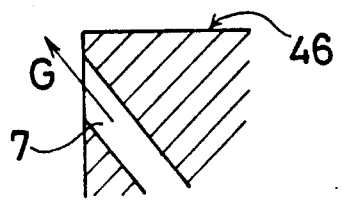
FIG. 5d is a partial vertical sectional view showing still another gas blowing section.

Furthermore, it may be appropriate that a nozzle opening 7 is formed in an upper side portion of a bag well 46 as shown in FIG. 5d.

Figure 6A:
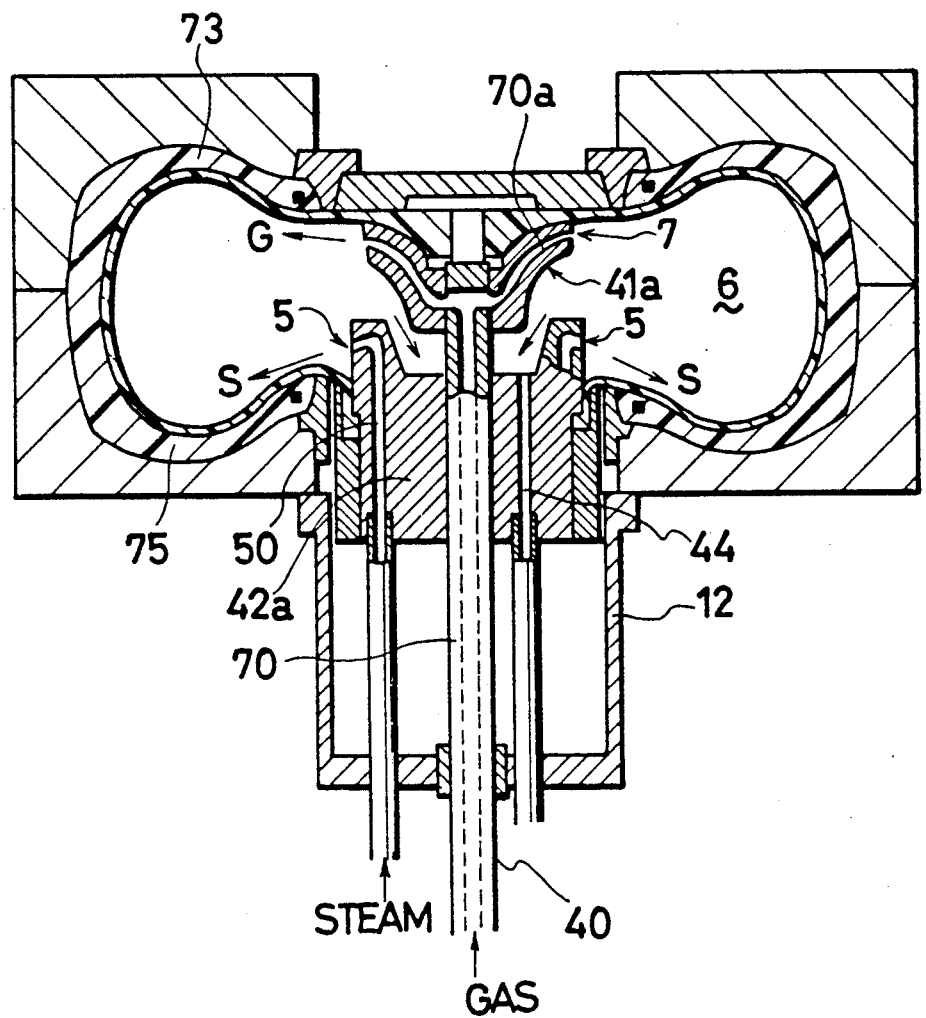
FIG. 6a is a vertical sectional view showing a seventh embodiment of the present invention.
Figure 6B:
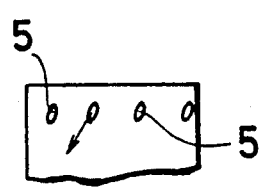
Figure 6C:
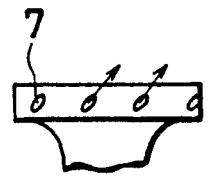

FIG. 6a, 6b, and 6c illustrate a seventh embodiment in which the present invention is applied to a rolling-in-bladder type vulcanizing machine. The second blow means includes a gas supply passage 70 formed in a center post 40, a plurality of blow passages 70a radially arranged in an upper clamp member 41a, and nozzles 7 provided in the forward end of respective blow passages 70a, the nozzle 7 facing an upper portion of an inner space 6, for example, an upper side wall 73 of a tire 2.

The first blow supply means includes a steam supply passage 50 formed in a bag well 42a, and a plurality of nozzles 5 which are circumferentially formed at a predetermined interval in an upper portion of the bag well 42a, the nozzles 5 being communicated with steam supply passage 50 and facing a lower portion of the inner space 6, for example, a lower side wall 75 of the tire 2. The nozzles 5 and 7 are formed so as to be included with respect to respective radial directions as shown in FIGS. 6b and 6c so that blown gas and steam circulate in a peripheral direction in the inner space 6. Indicated at 44 is a drain conduit. Indicated at 12 is a sleeve.

Figure 7A:
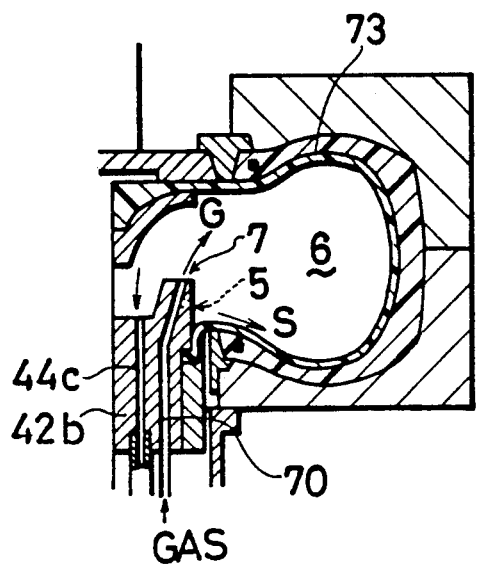
FIG. 7a is a vertical sectional view showing a eighth embodiment of the present invention.
Figure 7B:
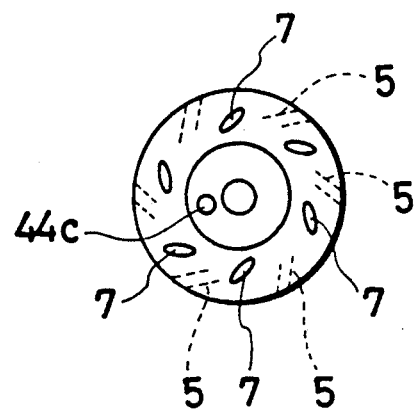

FIGS. 7a and 7b illustrate a eighth embodiment of the present invention. A gas supply passage 70 is provided in a bag well 42b and communicated with a plurality of nozzles 7 which are circumferentially arranged at a predetermined interval in an upper portion of the gas supply passage 70, namely at a lower position in the neighborhood of the central mechanism of the vulcanizing machine. The nozzle 7 is formed so as to face an upper portion of an inner space 6, for example, an upper side wall 73. Also, a steam supply passage, not shown, is provided in a bag well 42b and communicated with a plurality of nozzles 5 which are circumferentially arranged at a forward portion of the steam supply passage (not shown) and formed so as to face a lower portion of the inner space 6, for example, a lower side wall 75. The nozzles 5 and 7 are formed so as to be inclined with respect to respective radial directions as shown in FIG. 7b so that blown gas and steam circulate in a peripheral direction in the inner space 6. Furthermore, a passage 44c for discharging gas and steam is provided near the center of the bag well 42b.

Figure 8A:
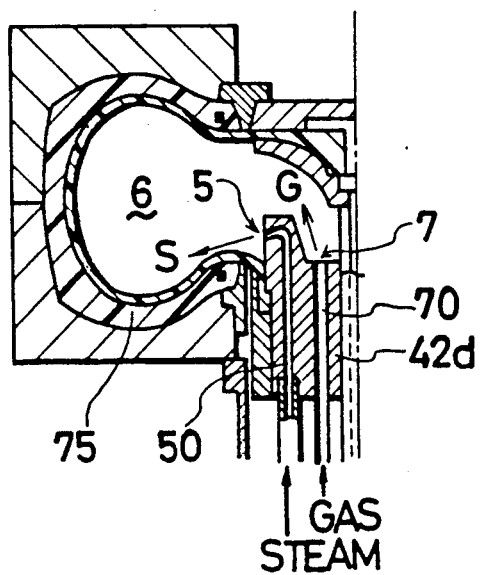
FIG. 8a is a vertical sectional view showing a ninth embodiment of the present invention.
Figure 8B:
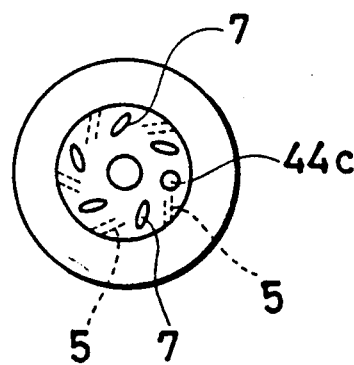

FIGS. 8a and 8b illustrate a ninth embodiment of the present invention. A gas supply passage 70 is formed in a well portion of a bag well 42d and communicated with a plurality of nozzles 7 which are circumferentially arranged at an upper portion of the gas supply passage 70, namely at a lower position in the neighborhood of the central mechanism of the vulcanizing machine. The nozzle 7 is formed so as to face an upper portion of an inner space 6. Also, a steam supply passage 50 is formed in an outer portion of the gas supply passage 70 and communicated with a plurality of nozzles 5 which are circumferentially arranged at an upper portion of the steam supply passage 50 and formed so as to face a lower portion of the inner space 6. The nozzles 5 and 7 are also inclined with respect to radial directions as shown in FIG. 8b so that blown gas and steam circulate in a peripheral direction in the inner space 6. Indicated at 44c is a drain conduit.

A method for vulcanizing an elastomer product in the form of a tire with use of an apparatus of the present invention will now be described. As a conventional method, firstly, a tire 2 is placed in a mold 1, a bladder 3 being made to come into contact with an inner surface of the tire 2 under pressure by supplying a shaping medium through a conduit not shown in the drawings, the mold 1 being closed so that the tire 2 is made to come into contact with the inner surface of the mold.

Steam is then supplied from the steam supply passage 50 through the nozzles 5 into the inner space 6 of the tire 2 at an appropriate pressure, e.g., 15 kg/cm$^2$ for an appropriate period of time, e.g., 5 minutes. The steam is blown in a downward direction from the nozzles 5 against the lower side wall 75 to produce jet streams. The jet streams heat the tire 2 to an appropriate temperature, e.g., 180° C., at which the progress of vulcanizing reaction is assured. Pressurizing gas having a temperature as low as room temperature, e.g., 40° C., is then supplied in an upward direction from the gas supply passage 70 through the nozzles 7 into the inner space 6 at an appropriate pressure, e.g., 18 kg/cm$^2$ and for an appropriate period of time, e.g., 5 minutes. The upwardly blown gas cools the upper portion of the inner space 6, then gradually moves down to the lower portion to mix with the steam. Consequently, the upwardly blown gas, which cools the upper portion of the tire inner space 6 and mixes with the steam, prevents a great temperature difference from occurring between the upper and lower portions of the inner space 6.

In the embodiments of FIGS. 1a and 2, blown gas temporarily stays within the space 60 defined by the enclosing wall 72 and then flows over the enclosing wall 72 into the inner space 6 to gradually mix with steam. Accordingly, in conventional methods, the steam is prevented from being adiabatically compressed in the upper portion of the inner space 6, which results in an unfavorable increase in the temperature of the upper portion and a cooling down of the lower bead portion.

Figure 4A:
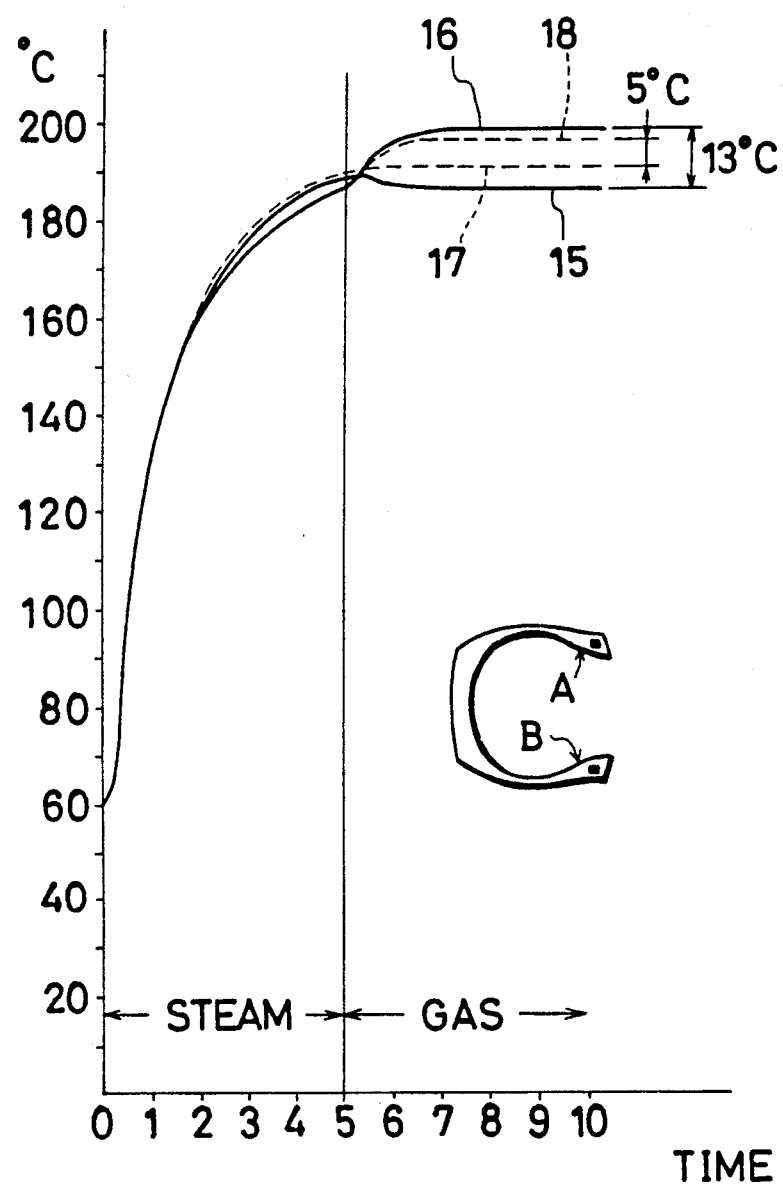

Consequently, a great temperature difference is eliminated between the upper and lower portions of the inner space 6 as conventional methods. For example, in the embodiment of FIG. 1a the temperature of point A of the upper bead portion rises along a broken line 18 of FIG. 4a after the supply of gas. The temperature of point B of the lower bead portion rises along a broken line 17 of FIG. 4a. The temperature difference between points A and B comes to be about 5° C. which is considerably small in comparison with the difference of 13° C. of the conventional method.

Figure 4B:
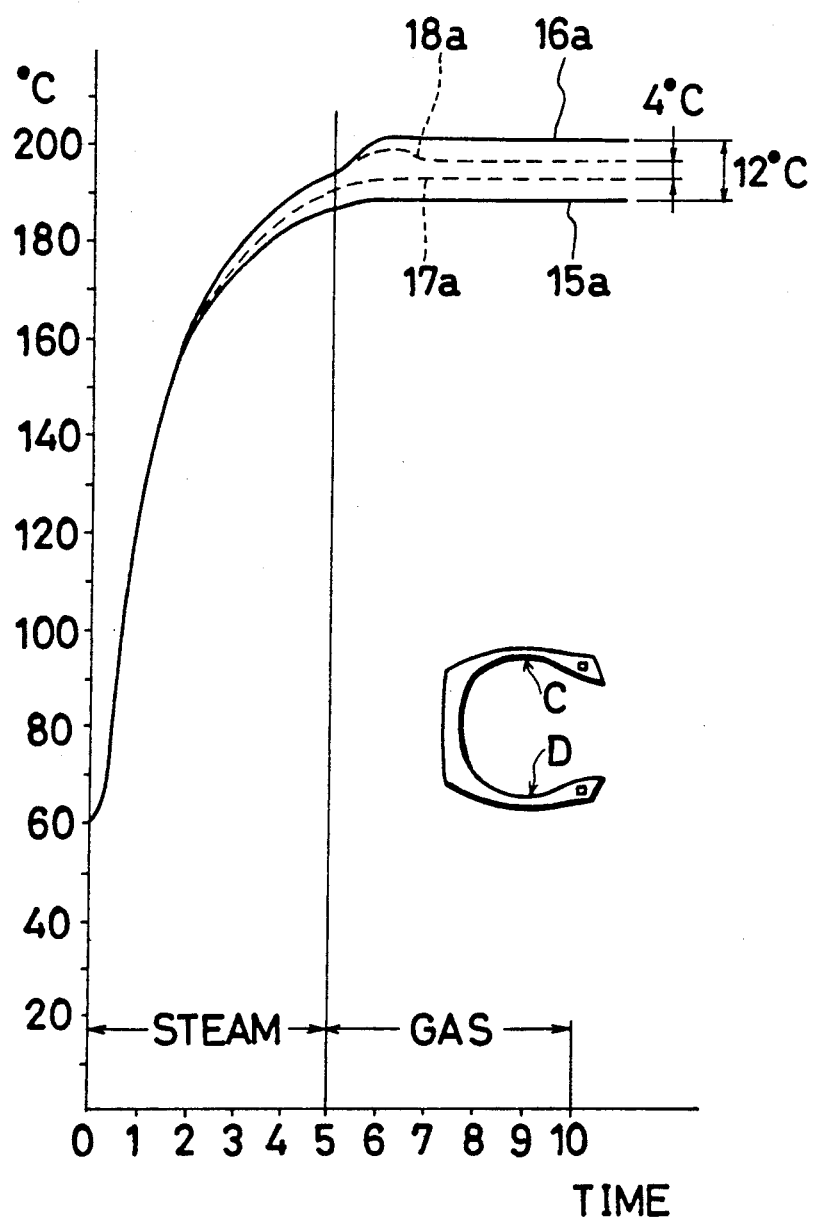

As shown in FIG. 4b, the temperature of point C of the upper side wall of a tire 2 rises along a broken line 18a after the supply of gas. The temperature of point D of the lower side wall rides along a broken line 17a. The temperature difference between points C and D comes to be about 4° C. which considerably small in comparison with the difference of 12° C. of the conventional method.

After completion of the vulcanizing operation, the mixture of gas and steam is discharged from the inner space 6 through the discharge line by opening a discharge valve not shown. Thereafter, the valve is closed and another valve for vacuum is opened to separate the bladder 3 from the tire 2. The vulcanized tire 2 is finally removed by moving an upper part of the mold 1 to open. It would be noted that in the case of vulcanizing without the use of a bladder, vacuum operation is not required.

In the case of a nylon carcass-ply tire, cooling water is introduced into the inner space. After vulcanizing, a mixture of gas and water is removed through a discharge line.

As described above, according to the present invention, heating medium, such as high temperature steam, is supplied by blowing in a downward direction into an inner space of an elastomer product placed in a mold, and pressurizing medium, such as low temperature gas, is supplied by blowing in an upward direction into the inner space. Consequently, steam and gas are properly mixed with each other to prevent a great temperature difference from occurring within the inner space and assures uniform vulcanizing. Since temperature differences are eliminated, vulcanizing can be completed in a shorter time. Thus, productivity can be improved and energy losses can be reduced.

What we claim is:

1. An apparatus for vulcanizing an elastomeric product comprising mold means in which said elastomeric product to be vulcanized is disposed, said product having a central axis which is vertically disposed such that upper and lower interior portions of said product overlie one another, a piston gland means having first supply passage means for supplying a heating medium, junction chamber means defining an annular junction chamber, said first supply passage means communicating with the interior of said junction chamber, said junction chamber means having an outer wall which separates said junction chamber from the interior of said product, nozzle means in said outer wall directing heating medium from said junction chamber into the interior of said product in a downward direction toward said lower portion of said product, enclosure means defining an enclosure overlying said junction chamber, said piston gland means having a second supply passage means for supplying a pressurizing medium, said second supply passage means communicating with said enclosure means to supply said pressurizing medium to said enclosure, said enclosure means having a top wall and a bottom wall, said enclosure means also having a weir wall extending upwardly from said bottom wall, said weir wall having an upper end spaced from said top wall to thereby define a weir passage between said upper end of said weir wall and said top wall of said enclosure means such that pressurizing medium passes from said enclosure to the upper portion of the interior of said product through said weir passage.

2. An apparatus according to claim 1, wherein said junction chamber means has a top wall and a bottom wall, said weir passage having an axial width measured parallel to said central axis within the range of 10 to 30% of the axial distance between said top wall of said enclosure means and said bottom wall of said junction chamber means.

3. An apparatus according to claim 2 further comprising plate means extending radially from said piston gland means, said plate means defining a common wall between said junction chamber means and said enclosure means, said plate means thereby defining said bottom wall of said enclosure means and said top wall of said junction chamber means, said plate means having an outer peripheral end, and further comprising annular wall means disposed on said outer peripheral end of said plate means, said annular wall means having an upper wall portion extending upwardly from said plate means and a lower wall portion extending downwardly from said plate means, said upper wall portion defining said weir wall, and lower wall portion defining said outer wall of said junction chamber means.

4. An apparatus according to claim 1 further comprising a clamp means extending generally radially outwardly of said piston gland means and engageable with the lower portion of said product, said clamp means having an upper surface which defines said bottom wall of said junction chamber means, said outer wall of said junction chamber means being mounted on said upper surface of said clamp member.

5. Apparatus according to claim 1 further comprising a central post and an upper clamp member mounted on said central post, said upper clamp member being engageable with the upper portion of said product, said upper clamp member having a bottom surface which defines said top wall of said enclosure means.

6. Apparatus according to claim 1, wherein said piston gland means has an upper end, and casing means mounted on said upper end of said piston gland means to define a casing compartment, said second supply passage means communicating with said casing compartment, said casing means having casing nozzle means for directing pressurizing medium from said casing compartment into said enclosure means.

7. Apparatus according to claim 6, wherein said casing means comprises a top wall, said casing nozzle means being disposed in said top wall of said casing means to thereby direct said pressurizing medium in an upward direction into said enclosure means.

8. An apparatus for vulcanizing an elastomeric product comprising mold means in which said elastomeric product to be vulcanized is disposed, said product having a central axis which is vertically disposed such that upper and lower interior portions of said product overlie one another, a piston gland means having first supply passage means for supplying a heating medium, junction chamber means defining an annular junction chamber, said first supply passage means communicating with the interior of said junction chamber, said junction chamber means having an outer wall which separates said junction chamber from the interior of said product, nozzle means in said outer wall directing heating medium from said junction chamber into the interior of said product in a downward direction toward said lower portion of said product, enclosure means defining an enclosure overlying said junction chamber, said enclosure means having an outer side opening up to said upper interior portion of said product, said piston gland means having an upper end, casing means mounted on said upper end of said piston gland means to define a casing compartment, said casing means being disposed within said enclosure means, second supply passage means in said piston gland means communicating with said casing compartment to supply a pressurizing medium to said casing compartment, said casing means having casing nozzle means for directing pressurizing medium from said casing compartment into said enclosure means such that pressurizing medium passes from said enclosure to said upper interior portion of said product.

9. An apparatus for vulcanizing an elastomeric product comprising mold means in which said elastomeric product to be vulcanized is disposed, said product having an axis which is vertically disposed such that upper and lower interior portions of said product overlie one another, a centrally disposed bag well means having a central passage, heating medium supply means disposed radially outwardly of said central passage for supplying a heating medium, said heating medium supply means having discharge means for discharging said heating medium downwardly toward said lower interior portion of said product, pressurizing medium supply means separate from said heating medium supply means disposed outwardly of said central passage for supplying a pressurizing medium, said pressurizing medium supply means having nozzle means for discharging said pressurizing medium upwardly so that said pressurizing medium passes to the upper interior portion of said product.

10. Apparatus according to claim 9, wherein said pressurizing medium supply means are disposed radially inwardly of said heating medium supply means.

11. Apparatus according to claim 9, wherein said central passage opens up to the interior of said product for conducting said heating medium and said pressurizing medium from said product.

12. Apparatus according to claim 9, wherein said nozzle means discharges said pressurizing medium in a direction toward said upper interior portion of said product.

13. Apparatus according to claim 10, wherein said nozzle means discharges said pressurizing medium in a generally vertical direction.

14. An apparatus for vulcanizing an elastomeric product comprising mold means in which said elastomeric product to be vulcanized is disposed, said product having an axis which is vertically disposed such that upper and lower interior portions of said product overlie one another, a centrally disposed bag well means, heating medium passage means in said bag well means, first nozzle means on said heating medium passage means for discharging heating medium downwardly toward said lower interior portion of said product, pressurizing medium passage means separate from said heating medium passage means in said bag well means, and second nozzle means on said pressurizing medium means for discharging pressurizing medium upwardly to pass to the upper interior portion of said product.

15. Apparatus according to claim 14 further comprising a drain passage in said bag well means for conducting said heating medium and said pressurizing medium from the interior of said product.

16. Apparatus according to claim 14, wherein said heating medium passage means is disposed radially outwardly of said pressurizing medium passage means.

17. Apparatus according to claim 14, wherein said second nozzle means discharges said pressurizing medium upwardly and radially outwardly toward said upper interior portion of said product.

* * * * *

UNITED STATES PATENT AND TRADEMARK OFFICE
CERTIFICATE OF CORRECTION

PATENT NO. : 5,020,982

DATED : June 4, 1991

INVENTOR(S) : Akinori Kubota, et al.

It is certified that error appears in the above-indentified patent and that said Letters Patent is hereby corrected as shown below:

The sheet of drawing consisting of figure 3d, should be deleted to be replaced with the attached sheet.

Signed and Sealed this

Twenty-eighth Day of September, 1993

Attest:

BRUCE LEHMAN

*Attesting Officer*   *Commissioner of Patents and Trademarks*